(12) United States Patent
Nagai

(10) Patent No.: US 9,159,983 B2
(45) Date of Patent: Oct. 13, 2015

(54) BATTERY, VEHICLE MOUNTING THE BATTERY, AND DEVICE MOUNTING THE BATTERY

(75) Inventor: Hiroki Nagai, Nagoya (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 415 days.

(21) Appl. No.: 12/679,940

(22) PCT Filed: Jun. 19, 2009

(86) PCT No.: PCT/JP2009/061163
§ 371 (c)(1),
(2), (4) Date: Mar. 25, 2010

(87) PCT Pub. No.: WO2010/146701
PCT Pub. Date: Dec. 23, 2010

(65) Prior Publication Data
US 2011/0268999 A1    Nov. 3, 2011

(51) Int. Cl.
| | |
|---|---|
| H01M 2/12 | (2006.01) |
| H01M 2/30 | (2006.01) |
| H01M 2/22 | (2006.01) |
| H01M 2/34 | (2006.01) |
| H01M 10/0525 | (2010.01) |

(52) U.S. Cl.
CPC .............. *H01M 2/30* (2013.01); *H01M 2/1241* (2013.01); *H01M 2/22* (2013.01); *H01M 2/34* (2013.01); *H01M 2/345* (2013.01); *H01M 10/0525* (2013.01); *Y02T 10/7011* (2013.01)

(58) Field of Classification Search
None
See application file for complete search history.

(56) References Cited

U.S. PATENT DOCUMENTS

| | | | |
|---|---|---|---|
| 5,585,207 A | 12/1996 | Wakabe et al. | |
| 6,248,470 B1 * | 6/2001 | Azema et al. | 429/61 |
| 2006/0019150 A1 * | 1/2006 | Rigobert et al. | 429/56 |
| 2008/0038627 A1 * | 2/2008 | Yamauchi et al. | 429/53 |

FOREIGN PATENT DOCUMENTS

| | | |
|---|---|---|
| EP | 0 674 351 A2 | 9/1995 |
| JP | 7-245090 | 9/1995 |
| JP | 11-204094 | 7/1999 |

(Continued)

*Primary Examiner* — Ula C Ruddock
*Assistant Examiner* — Daniel Gatewood
(74) *Attorney, Agent, or Firm* — Finnegan, Henderson, Farabow, Garrett & Dunner, LLP

(57) ABSTRACT

A battery includes a current breaking mechanism 20 provided in a battery and configured such that an external terminal 21 connecting a terminal rivet 31 connected to a power generating element 16 to an electrode terminal is provided with thick portions 48 and 49 and a breakable portion 45 so that the thick portions 48 and 49 are continuous through the breakable portion 45 only. The battery further includes: the terminal rivet 31 placed passing through a closing plate 12 forming a part of a battery case 11, a part of the terminal rivet 31 located outside the battery case 11 being placed on the thick portion 48 of the external terminal 21 in close contact relation, the terminal rivet 31 having a through hole 32; and a sealing cap 25 covering an exit of the through hole 32 on the outside of the battery case 11 and being joined to the external terminal 21 over the entire circumference of the through hole 32 or joined to both the external terminal 21 and the terminal rivet 31 across them. When the internal pressure of the battery case 11 rises, at least part of the sealing cap 25 is moved away from the battery case 11, deforming a part of the external terminal 21, thereby breaking the breakable portion 45.

11 Claims, 12 Drawing Sheets

(56) References Cited

FOREIGN PATENT DOCUMENTS

| JP | 11-297303 | 10/1999 |
| JP | 11-329405 | 11/1999 |
| JP | 11329405 A * | 11/1999 |
| JP | 2001-135357 | 5/2001 |
| JP | 2001-237151 | 8/2001 |
| JP | 2003346762 A * | 12/2003 |
| JP | 2008-66254 | 3/2008 |

* cited by examiner

BATTERY, VEHICLE MOUNTING THE BATTERY, AND DEVICE MOUNTING THE BATTERY

CROSS-REFERENCE TO RELATED APPLICATIONS

This application is a national phase application of International Application No. PCT/JP2009/061163, filed Jun. 19, 2009, the contents of which are incorporated herein by reference.

TECHNICAL FIELD

The present invention relates to a sealed battery such as such a lithium ion secondary battery, a vehicle mounting the battery, and a device mounting the battery, and more particularly relates to a battery configured to break a current by interrupting a current path when internal pressure rises, a vehicle mounting the battery, and a device mounting the battery.

BACKGROUND ART

In a sealed battery such as a lithium ion secondary battery to be mounted in a vehicle and other devices, gas may be stored due to overcharging, excessive rise in temperature, breakage by external forces, and others. Furthermore, the gas may cause a rise in internal pressure of the battery. A battery case of the sealed battery is therefore usually formed with a breakable portion for safety. For instance, some batteries include a battery case partially formed with a member deformable by battery internal pressure so that the member is deformed to break a breakable portion. In those batteries, the breakage of the breakable portion cuts off a current path or provides a gas outlet between the inside and the outside of a secondary battery, and so on.

For example, Patent Literature 1 discloses a secondary battery provided with a diaphragm attached to an electrode terminal on the inner side of the battery. In this device of the Literature, a part of a breakable portion is fixed to the diaphragm. Accordingly, when the diaphragm is deformed by a rise in internal pressure, the breakable portion is broken or cleaved. A current path at that place in the battery is thus cut off.

CITATION LIST

Patent Literature

Patent Literature 1: JP2008-66254 A

SUMMARY OF INVENTION

Technical Problem

However, the aforementioned conventional technique requires a space between the electrode terminal and an attachment place of the diaphragm to allow the diaphragm to be deformed. This causes a problem that a dead space is present in the battery.

The present invention has been made to solve the above problems of the conventional technique and has a purpose to provide a battery configured to have no dead space in the battery and provide high shock resistance and vibration resistance, and be able to reliably cut off a current path when internal pressure rises, a vehicle mounting the battery, and a device mounting the battery.

Solution to Problem

To achieve the above purpose, one aspect of the present invention provides a battery comprising a battery case, a power generating element having a positive electrode and a negative electrode hermetically contained in the battery case, and positive and negative electrode terminals provided on the outside of the battery case, wherein at least one of joining portions of the power generating element with the positive electrode terminal and the negative electrode terminal includes: an external terminal placed on the outside of the battery case, the external terminal including a first portion, a second portion, and a breakable portion weaker than both the first and second portions, the first and second portions being continuous to each other through only the breakable portion; a current collecting member placed passing through the battery case so that at least a part of the current collecting member located outside the battery case is placed on the first portion of the external terminal in close contact relation, and the current collecting member being formed with a through hole for providing communication between the inside and the outside of the battery case; and a sealing cap covering an outer exit of the through hole on the outside of the battery case and being joined to the external terminal over the entire circumference of the through hole or joined to the external terminal and the current collecting member across them, the second portion of the external terminal is connected to the electrode terminal, the current collecting member is connected to the power generating element inside the battery case, and the sealing cap is configured to at least partially move away from the battery case when internal pressure of the battery case rises, causing a part of the external terminal to be deformed to break the breakable portion.

According to the above battery, at least one of the joining portions between the power generating element and the electrode terminals includes the external terminal, the current collecting member, and the sealing cap. The through hole of the current collecting member allows communication between the inside and the outside of the battery case. The exit of the through hole on the outer side is closed by joining of the sealing cap and the external terminal. Accordingly, when the internal pressure of the battery case rises, the pressure acts on the inside of the sealing cap (on the external terminal side). This pressure causes the sealing cap to move, thereby breaking the breakable portion. Since the sealing cap is moved away from the battery case, no space for such movement is necessary inside the battery case. Consequently, no dead space is created in the battery.

The external terminal includes the first and second portions and the breakable portion. Of them, the first portion is covered with the current collecting member and hence connected to the power generating element through the current collecting member. The entire current collecting member does not necessarily have to cover the first portion. Such connecting method is strong, providing high shock resistance and vibration resistance. On the other hand, the second portion is connected to the electrode terminal. Since the first portion and the second portion are continuous to each other through only the breakable portion, accordingly, a current path joining the power generating element and the electrode terminal is cut off when the breakable portion is broken. Consequently, when the internal pressure rises, the current path can be surely cut off. The electrode terminal and the external terminal in the above configuration may be formed integrally or separately.

In the above battery, preferably, the external terminal is formed, in at least one of the first portion and the second portion, with a thin portion thinner than other portions, and the thin portion is deformed when the internal pressure of the battery case rises. When the thin portion is deformed, the breakable portion can be surely broken.

In the above battery, further preferably, the external terminal is configured such that the second portion is formed around the first portion, and at least the second portion is formed with the thin portion, and the sealing cap is joined to the second portion of the external terminal at an entire circumferential joining portion extending around the entire circumference of the through hole, the sealing cap being out of contact with both the first portion of the external terminal and the current collecting member at least after the breakable portion is broken.

With such configuration, the second portion and the entire circumferential joining portion joined to the second portion are respectively formed to surround the breakable portion. Accordingly, the battery can maintain airtightness by the entire circumferential joining portion.

In the above battery, further preferably, the external terminal is formed with a slit between the second portion and the first portion and within a range of a region defined by the entire circumferential joining portion, the first portion is surrounded by the breakable portion and the slit, the thin portion is in the range of the region defined by the entire circumferential joining portion, and the sealing cap is joined to the second portion of the external terminal also at the thin portion or a portion between the thin portion and the breakable portion.

With such configuration, the current path can also surely be cut off if the breakable portion is broken. Furthermore, the sealing cap is moved on the inner side than the entire circumferential joining portion during the pressure rise, so that the thin portion is easily deformed.

In the above battery, further preferably, the external terminal is configured such that the slit is formed in two places in parallel with each other, and the breakable portion is formed in two places between the two slits and in a direction perpendicular to the slits.

With such configuration, if the two breakable portions are broken, the range surrounded by the broken portions and the slits are isolated from the other range more outside than the former range. Thus, the current path is surely cut off.

Further preferably, the above battery further comprises an insulating member placed between the external terminal and the battery case, a surface of the insulating member facing the external terminal being formed with at least one of a protrusion fitted in the slit and a protrusion fitted with the thin portion.

With such configuration, the external terminal is easily positioned in place by the insulating member in assembling.

In the above battery, further preferably, at least the first portion is formed with the thin portion. The sealing cap is joined to the first portion of the external terminal at the entire circumferential joining portion extending around the entire circumference of the through hole or joined to and across the current collecting member and the first portion of the external terminal, and at least a part of the portions of the external terminal joined to the entire circumferential joining portion include the thin portion or a region between the thin portion and the weak portion.

Such configuration can also provide the same effects as above.

Another aspect of the invention further provides a vehicle comprising: a motor for driving wheels to rotate upon receiving supply of electric power; and a power source for supplying the electric power to the motor, the power source including the aforementioned battery.

Moreover, another aspect of the invention further provides a device comprising: an operating part to be operated upon receiving supply of electric power; and a power source for supplying the electric power to the operating part, the power source including the aforementioned battery.

Advantageous Effects of Invention

According to the battery configured as above, the vehicle mounting the battery, and the device mounting the battery, it is possible to produce no dead space in the battery, provide high shock resistance and vibration resistance, and reliably cut off a current path when internal pressure rises.

DESCRIPTION OF EMBODIMENTS

A detailed description of a preferred embodiment of the present invention will now be given referring to the accompanying drawings. In this embodiment, a current breaking mechanism of the invention is applied to the vicinity of an electrode terminal of a lithium ion secondary battery.

Figure 1:
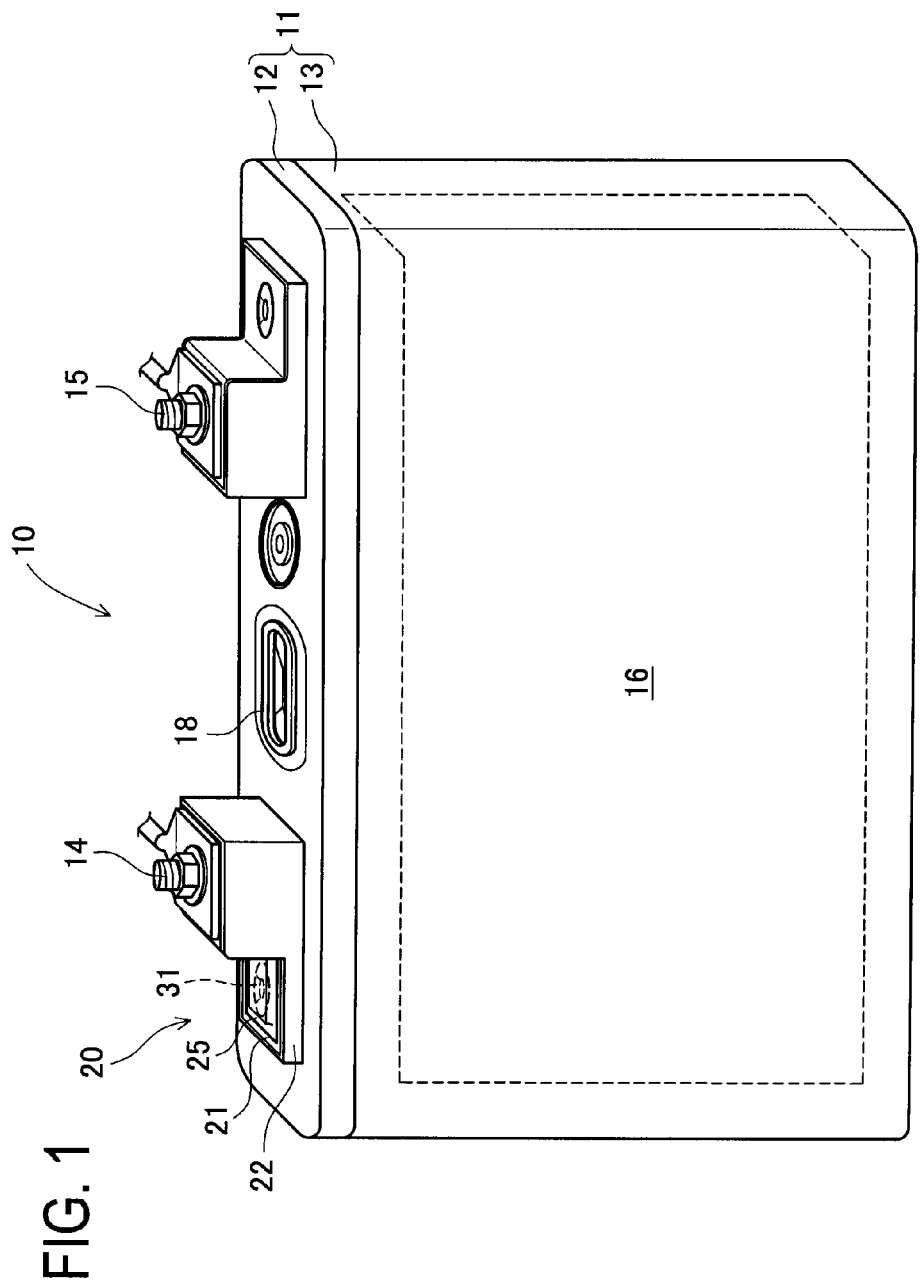
FIG. 1 is a perspective view of a secondary battery in a preferred embodiment.

A secondary battery 10 in this embodiment is configured as shown in FIG. 1 such that positive and negative electrode terminals 14 and 15 are provided on the outside of a flat-shaped battery case 11. A power generating element 16 is hermetically housed in the battery case 11. The battery case 11 has a box-shaped main body 13 having one open side and a closing plate 12 that closes the open side. The positive terminal 14 and the negative terminal 15 are connected respectively to positive and negative electrode plates and others included in the power generating element 16. A safety valve 18 is formed in the battery case 11 at a place between the terminals 14 and 15. This safety valve 18 is broken to release internal gas from the secondary battery 10 when internal pressure of the secondary battery 10 remarkably rises.

In this embodiment, as shown in FIG. 1, a current breaking mechanism 20 is also formed adjacent to the positive terminal 14. This current breaking mechanism 20 operates to cut off a current path when the internal pressure of the secondary battery 10 rises. This current breaking mechanism 20 operates under lower internal pressure than the internal pressure at which the safety valve 18 operates. The operation of the current breaking mechanism 20 causes cutting off of the current path of the secondary battery 10 but no release of gas. In this embodiment, the current breaking mechanism 20 is not formed on the negative electrode terminal 15 side. The negative electrode terminal 15 and its surrounding configuration are identical to conventional ones and thus their details are not explained here.

Figure 2:
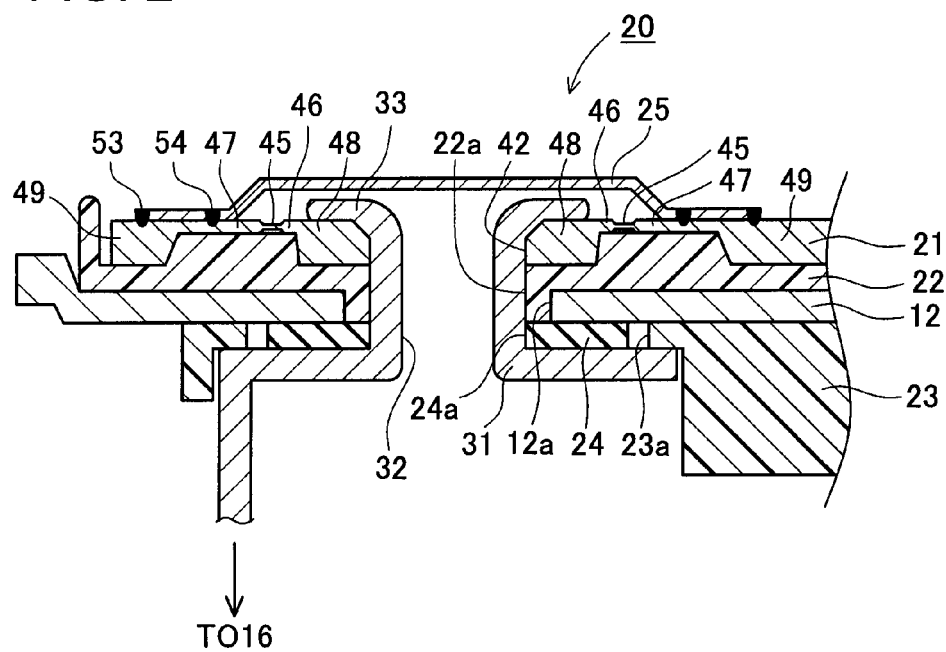
FIG. 2 is an end view showing a current breaking mechanism.
Figure 14:
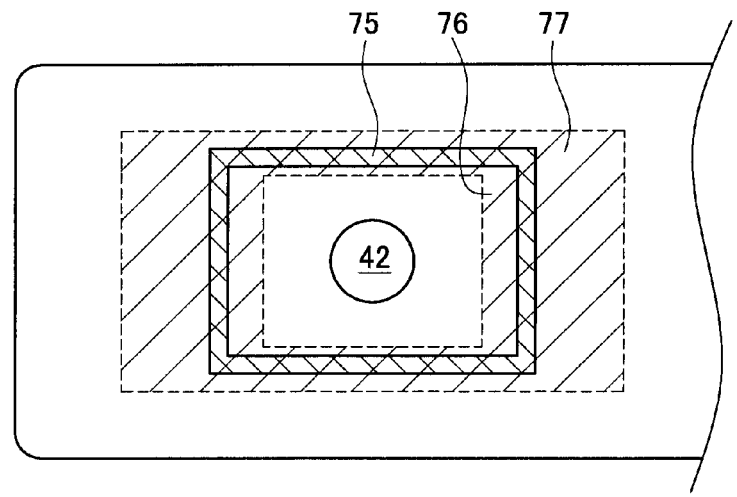
FIG. 14 is an explanatory view showing another example of an external terminal.

The current breaking mechanism 20 in this embodiment has one cross section configured as shown in FIG. 2. FIG. 2 shows only components surrounding the current breaking mechanism 20 in the cross section parallel with the drawing sheet of FIG. 1. In this place, an external terminal 21, an insulating gasket 22, an insulating spacer 23, and a sealing gasket 24 are fixed to the closing plate 12 with a terminal rivet 31. An upper portion of the terminal rivet 31 in the figure is bent on the outside of the battery case 11. The bent portion is located so as to cover the external terminal 21 in close contact relation. Furthermore, a sealing cap 25 is attached to the secondary battery 10, more outside than the terminal rivet 31. The positive electrode terminal 14 in FIG. 14 is attached to an upper step portion 21a (see FIG. 3) of the external terminal 21 that is a stepped metal member.

In this embodiment, the closing plate 12, the positive electrode terminal 14, the external terminal 21, the sealing cap 25, and the terminal rivet 31 are all made of aluminum or aluminum alloy. On the other hand, the insulating gasket 22, the insulating spacer 23, and the sealing gasket 24 are insulating members. For instance, the insulating gasket 22 and the insulating spacer 23 are made of synthetic resin and the sealing gasket 24 is made of synthetic rubber, respectively.

Figure 3:
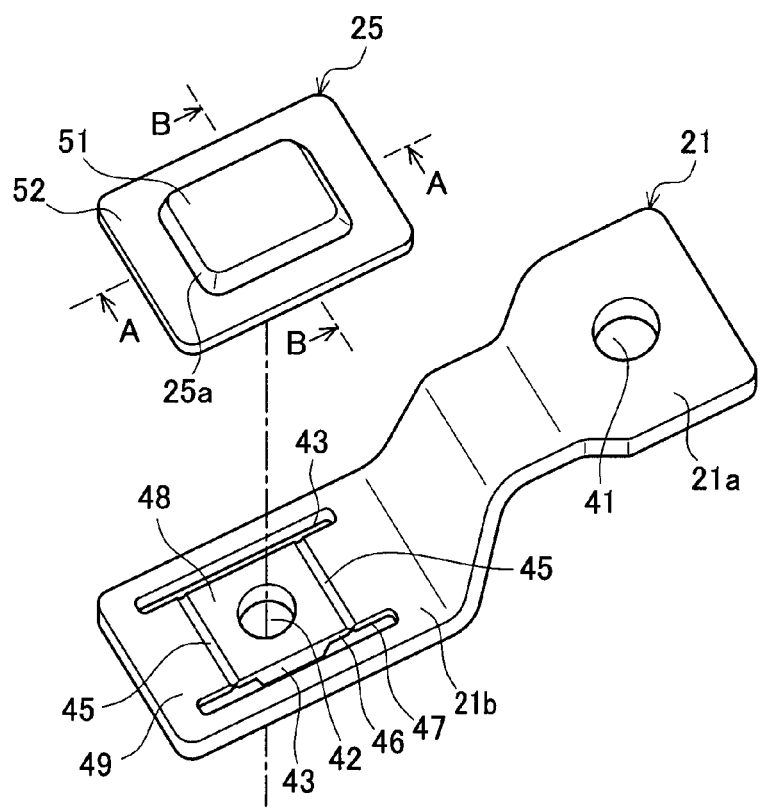
FIG. 3 is an exploded perspective view showing a sealing cap and an external terminal.

FIG. 3 is a perspective view showing the shapes of the external terminal 21 and the sealing cap 25. FIG. 2 is an end view taken along a line A-A in FIG. 3. The external terminal 21 includes the upper step portion 21a and a lower step portion 21b integrally formed in stepped shape. The upper step portion 21a is formed with a through hole 41 through which the positive electrode terminal 14 passes and the lower step portion 21b is formed with a through hole 42 through which the terminal rivet 31 passes.

The lower step portion 21b is further formed with two slits 43 extending along a longitudinal direction (a direction from lower left to upper right in the figure) as shown in FIG. 3. The two slits 43 have the same shape and arranged in parallel with each other while interposing therebetween the through hole 42. Moreover, two parallel breakable portions 45 are formed on both sides of the through hole 42 in a direction perpendicular to the slits 43. Accordingly, the through hole 42 is surrounded on all four sides by the slits 43 and the breakable portions 45. Each breakable portion 45 is a recessed groove formed not through the external terminal 21 and as a much thinned portion.

As shown in the end view of FIG. 2, furthermore, portions continuous to the breakable portions 45 are thin portions 46 and 47 formed thinner than other portions of the external terminal 21. Thick portions 48 and 49 are formed on both sides of the thin portions 46 and 47 in the figure. In other words, the thin portions 46 and the thick portion 48 are formed on a side closer to the centered terminal rivet 31 relative to the breakable portions 45. The thin portions 47 and the thick portion 49 are formed outside the weak portions 45.

Figure 4:
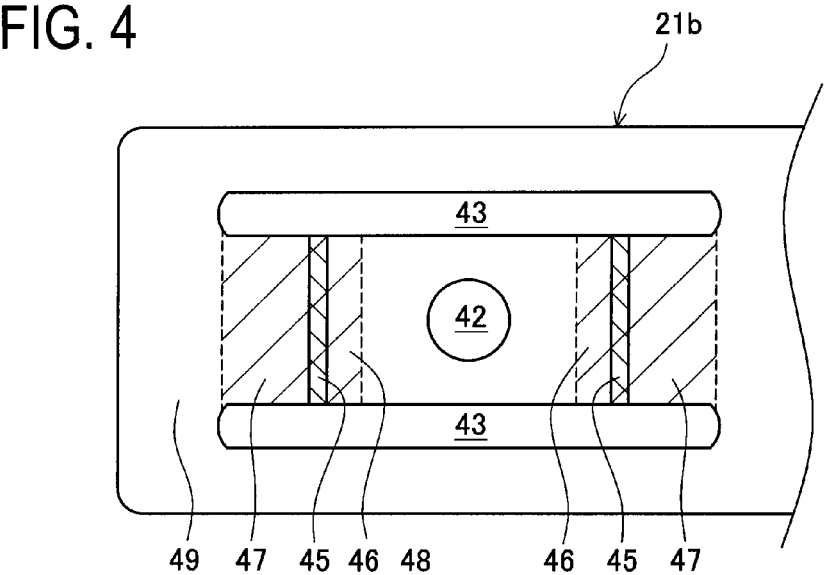
FIG. 4 is an explanatory view showing the external terminal.

Therefore, the lower step portion 21b of the external terminal 21 is seen as shown in FIG. 4 when viewed from above in the figure of FIG. 2. In a range located between the slits 43, centering the through hole 42, there are formed the thick portion 48, the thin portions 46, the breakable portions 45, and the thin portions 47. Outside the range located between the slits 43, the thick portion 49 is formed. The ranges of the thin portions 46 and 47 are areas (each two portions) surrounded by broken lines and shown with hatching in FIG. 4.

Of them, the thick portion 48 and the two thin portions 46 correspond to a first portion. On the other hand, the two thin portions 47 and the thick portion 49 correspond to a second portion. On either of the right and left sides in the figure, the thin portions 46 and 47 are made continuous to each other through only the breakable portion 45. Thus, at least one of the breakable portion 45 and the slit 43 is located at a boundary between the first and second portions. Accordingly, the first and second portions are continuous through only the breakable portions 45.

Each thin portion 47 has an upper surface flush with those of the thick portions 48 and 49 located on both sides in FIG. 2 and a lower surface recessed upward in the figures. The thick portion 48 around the through hole 42 is fixed to the bent terminal rivet 31 as shown in FIG. 2. The bent portion of the terminal rivet 31 is fully held in tight contact with the upper side of the thick portion 48. The bent portion may also be placed in contact with the thin portions 46 but needs to be placed out of contact with any portions more outside than the thin portions 46. In other words, the terminal rivet 31 is in contact with only the first portion of the external terminal 21.

Furthermore, the thick portion 49 is an outer frame portion in the lower step portion 21b and continuous to the upper step portion 21a. The thickness of each thick portion 48 and 49 is the thickness of an aluminum plate commonly used for the external terminal. In this embodiment, the upper step portion 21a and a stepped portion between the upper step portion 21a and the lower step portion 21b and others are all made with this thickness.

In this embodiment, the thin portions 47 of the external terminal 21 are made so thin as to be deformed under a certain level of force. For example, the thickness is about 0.1 to 0.3 mm. The thickness of the breakable portions 45 is so thin as to be easily broken or cleaved, preferably 100 μm or less, for example. On the other hand, each of the thick portions 48 and 49 has a thickness of about 1 to 3 mm, which is not easily deformed. The above configuration enables the breakable portions 45 to be broken when the thin portions 47 are deformed by some pressure. Then, the current path through the external terminal 21 is cut off between the thick portion 48 and the thick portion 49.

The sealing cap 25 is an almost plate-like member having an almost rectangular outer shape as shown in FIG. 3. The sealing cap 25 includes a step 25a, a plateau 51 on the center, and a flange 52 around the plateau 51. The plateau 51 is slightly higher than the flange 52. The flange 52 is of an almost flat surface. This sealing cap 25 is placed from above in FIG. 2 on the lower step portion 21b of the external terminal 21 and joined thereto.

Figure 5:
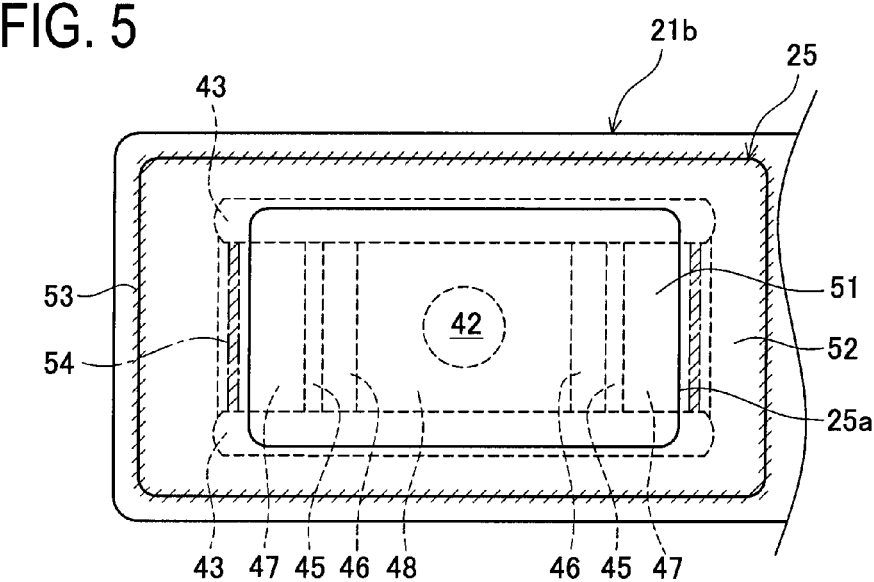
FIG. 5 is an explanatory view showing a state where the sealing cap is placed on the external terminal.

The flange 52 of the sealing cap 25 has an outer dimension slightly smaller than the lower step portion 21b of the external terminal 21. When the sealing cap 25 is placed on the lower step portion 21b of the external terminal 21, as shown in FIG. 5, the through hole 42, the slits 43, the weak portions 45, and the thin portions 47 are all covered over by the sealing cap 25. The sealing cap 25 in this embodiment is integrally made of an aluminum plate or the like having a thickness of about 0.2 to 0.3 mm. For example, the sealing cap 25 has the strength equal to the thin portions 47 of the external terminal 21 and hence can relatively easily be deformed.

Figure 6:
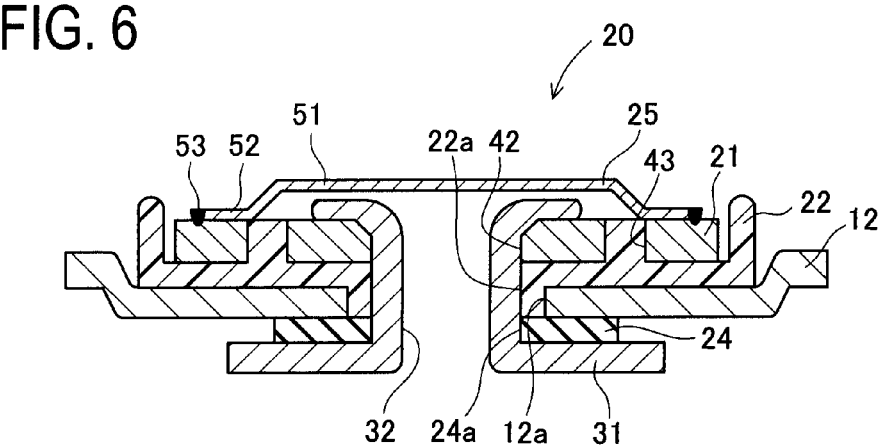
FIG. 6 is an end view showing a current breaking mechanism.

The step 25a is located on any of the slits 43 and the thin portions 47 as shown in FIG. 5. The through hole 42, the thick portion 48, and the weak portions 45 are covered over by the plateau 51. This plateau 51 is designed to be so high as not to touch the bent terminal rivet 31 when the sealing cap 25 is attached to the external terminal 21 as shown in FIGS. 2 and 6. FIG. 6 is an end view taken along a line B-B in FIG. 3.

The sealing cap 25 is welded to the external terminal 21 at an outer circumferential joining portion 53 and an inner joining portion 54 as indicated by oblique lines in FIG. 5. The outer circumferential joining portion 53 is an entire circumferential joining part formed over the entire outer circumference of the sealing cap 25. For instance, this part is sealed by seamless laser welding performed with smaller pitches than welding size. On the other hand, a part of the flange 52 relatively near the plateau 51 is joined to the thin portions 47 through the inner joining portion 54. This part does not need to be sealed. For instance, laser welding may be performed at appropriate space intervals. In this embodiment, the inner joining portion 54 is provided more outside than the breakable portions 45.

Figure 7:
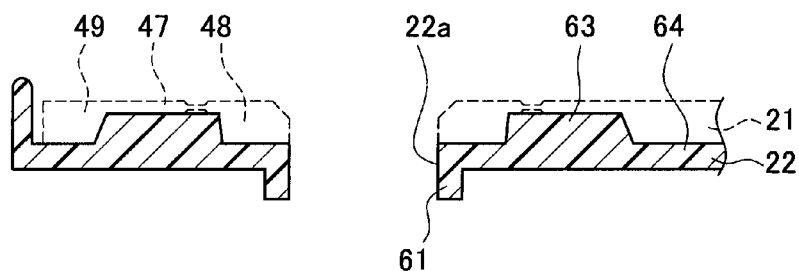
FIG. 7 is an end view showing an insulating gasket.
Figure 8:
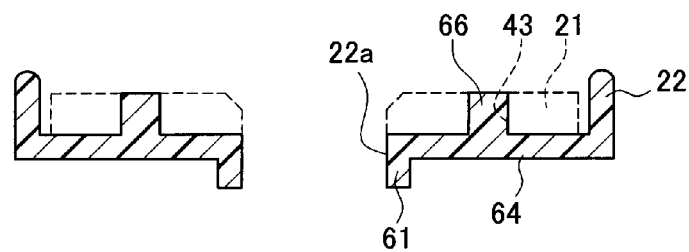
FIG. 8 is an end view showing the insulating gasket.

Furthermore, other members of the current breaking mechanism 20 in this embodiment will be described below. The insulating gasket 22 is explained referring to FIGS. 7 and 8. FIGS. 7 and 8 are end views of the insulating gasket 22 showing the same cross sections as FIGS. 2 and 6, respectively. In those figures, the external terminal 21 is shown by a broken line. The insulating gasket 22 is formed with a through hole 22a through which the terminal rivet 31 is inserted. A wall surface 61 of the through hole 22a of the insulating gasket 22 is formed slightly protruding downward in FIG. 2. This prevents contact between the terminal rivet 31 and the closing plate 12 as shown in FIG. 2.

An upper surface of the insulating gasket 22 in FIGS. 7 and 8 is designed to conform to the shape of a lower surface of the external terminal 21 in the figure. Accordingly, the external terminal 21 can be easily positioned in place during assembling. For instance, as shown in FIG. 7, there are provided a thin-portion supporting portion 63 corresponding to the thin portion 47 of the external terminal 21 and a thick-portion supporting portion 64 corresponding to the thick portions 48 and 49. The thick-portion supporting portion 64 has a thickness normally used as the insulating gasket 22, while the thin-portion supporting portion 63 is about twice as thick as the thick-portion supporting portion 64. Thus, the lower surface of the thin portions 47 of the external terminal 21 are supported by and in contact with the thin-portion supporting portion 63. This prevents the thin portions 47 from needlessly becoming deformed downward in FIG. 2. This thin-portion supporting portion 63 does not necessarily have to conform to the shape of the breakable portions 45.

Furthermore, the insulating gasket 22 is formed with protrusions 66 in places corresponding to the slits 43 of the external terminal 21 as shown in FIG. 8. An upper surface of each protrusion 66 in the figure is almost flush with the external terminal 21 on both sides of each slit 43. To be specific, each protrusion 66 is arranged so as to be inserted in each slit 43 and appear in an upper surface of the external terminal 21 in the figure. The flange 52 of the sealing cap 25 is partially placed on the protrusions 66 as shown in FIG. 6. These protrusions 66 prevent short circuit between the thick portion 48 and the thick portion 49 even when the thin portions 47 are deformed. These protrusions 66 also contribute to positioning of the external terminal 21 during assembling. It is to be noted that the thin-portion supporting portion 63, thick-portion supporting portion 64, and protrusions 66 are not all necessary for the positioning and either one may be chosen.

As shown in FIG. 2, the closing plate 12, the insulating spacer 23, the sealing gasket 24 are also provided with through holes 12a, 23a, and 24a respectively for passing the terminal rivet 31. The through hole 23a of the insulating spacer 23 is larger than the outer diameter of the sealing gasket 24. Accordingly, the sealing gasket 24 is inserted in the through hole 23a of the insulating spacer 23.

The terminal rivet 31 has a through hole 32 axially formed through the inside of the rivet 31 as shown in FIGS. 2 and 6. In the secondary battery 10 in this embodiment, the terminal rivet 31 is inserted through the through holes of the insulating spacer 23, the sealing gasket 24, the closing plate 12, the insulating gasket 22, and the external terminal 21 in order. The upper portion of the rivet 31 is then bent in the figure. After the terminal rivet 31 is bent in this way, the sealing cap 25 is joined to the external terminal 21. The sealing cap 25 is welded to the lower step portion 21b of the external terminal 21 at the outer circumferential joining portion 53 and the inner joining portion 54 respectively.

Specifically, in the secondary battery 10 in this embodiment, the external terminal 21 and the insulating gasket 22 are fixed to the closing plate 12 by the terminal rivet 31. The terminal rivet 31 is a tubular but sufficiently strong member. This fixing method therefore provides high resistance to external forces such as vibration. The secondary battery 10 provides long life and superior creep resistance even when mounted in a vehicle or others for example.

Since the secondary battery 10 is assembled as above, the upper end portion 33 of the terminal rivet 31 is in contact with the thick portion 48 of the external terminal 21 as shown in FIG. 2. The upper step portion 21a of the external terminal 21 is electrically conducted to the positive electrode terminal 14 at its attachment portion. The terminal rivet 31 is connected to positive electrode plates of the power generating element 16 in the battery case 11. Thus, the positive electrode plates of the power generating element 16 and the positive electrode terminal 14 are electrically conducted to each other through the terminal rivet 31 and the external terminal 21.

In this current path, the thick portion 48 is surrounded by the slits 43 and the weak portions 45 as shown in FIG. 4. Furthermore, the sealing cap 25 is out of contact with the terminal rivet 31 and the thick portion 48 as shown in FIG. 2. In other words, the current path joining the thick portion 48 and the upper step portion 21a of the external terminal 21 surely passes the breakable portions 45. When the breakable portions 45 are broken, therefore, the thick portion 48 is electrically isolated from the upper step portion 21a. This cuts the current path connecting the positive electrode plates of the power generating element 16 and the positive electrode terminal 14.

Figure 9:
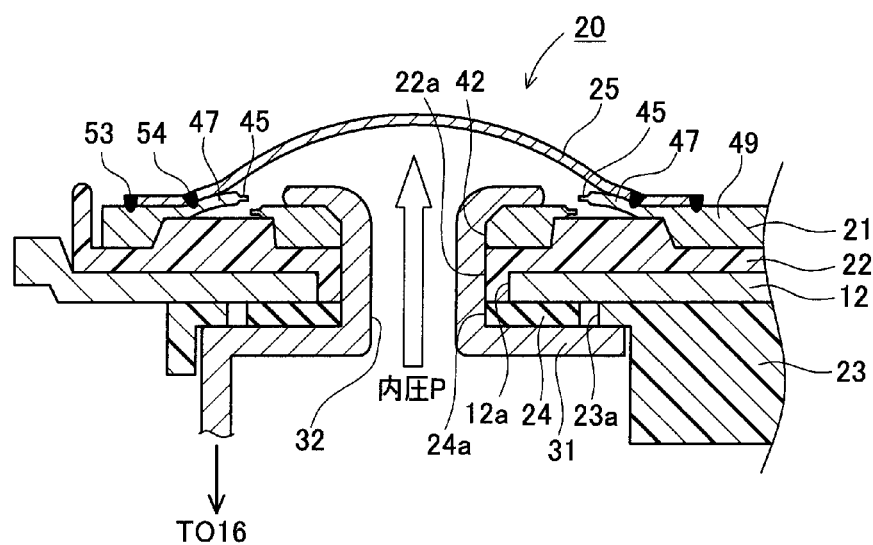
FIG. 9 is an end view showing a state of the current breaking mechanism after operated.

During use of the secondary battery 10, gas may be stored due to some causes. As the amount of gas increases, the internal pressure of the secondary battery 10 may rise. This internal pressure P also acts on the space under the sealing cap 25 communicated through the through hole 32 as shown in FIG. 9. A rise in the internal pressure P causes an increase in the volume of this space. The sealing cap 25 is thus pushed upward from below in the figure by a pressure difference between the internal pressure and the external pressure. At least a central portion of the cap 25 is moved away from the battery case 11 and hence the cap 25 is deformed as shown in the figure.

At the same time as this deformation, the thin portions 47 are pulled up by the inner joining portion 54 where joined to the sealing cap 25. Since the thin portions 47 are relatively easily deformable, they are also deformed as shown in FIG. 9 when the internal pressure P rises to a certain level. This deformation also breaks the breakable portions 45, thereby cutting the current path as described above. The thickness of each of the sealing cap 25, the thin portions 47, and the breakable portions 45 and the location of the inner joining portion 54 are respectively appropriately selected so that the internal pressure P at which the breakable portions 45 are broken is an appropriate level.

Furthermore, the sealing cap 25 is welded to the external terminal 21 at the outer circumferential joining portion 53 while entirely covering the entire circumference of the through hole 32 of the terminal rivet 31. This outer circumferential joining portion 53 is located in the thick portion 49 which is not easily deformed. Thus, the inside of the secondary battery 10 remains sealed by the sealing cap 25 even when the breakable portions 45 are broken. In other words, no foreign matters such as water are not allowed to externally enter the secondary battery 10. There is also no possibility of leakage of electrolyte from the inside of the secondary battery 10.

In the secondary battery 10 in this embodiment, the terminal rivet 31 has the through hole 32 and therefore the internal pressure P surely acts on the inside of the sealing cap 25. On the other hand, the outside of the sealing cap 25 constitutes an exterior portion of the secondary battery 10 and thus is subjected to atmospheric pressure. In other words, the sealing cap 25 is directly subjected to a pressure difference between the internal pressure P and the atmospheric pressure. In this embodiment, accordingly, when the internal pressure P of the secondary battery 10 reaches an internal pressure at which the current breaking mechanism 20 has to operate, the current breaking mechanism 20 surely operates. Thus, the mechanism can achieve a high reliability.

In this embodiment, while the sealing cap 25 is not still attached, the inside and the outside of the battery case 11 are communicated through the through hole 32 of the terminal rivet 31. Accordingly, the through hole 32 in this state can be used as an liquid inlet for pouring electrolyte. No special liquid inlet is thus required.

In this embodiment, furthermore, the secondary battery 10 includes the power generating element 16 in which strip-shaped electrode plates having been wound around the axis extending a lateral direction in FIG. 1 and then flattened in a depth direction in the figure into a flattened shape. Ends of the strip-shaped electrode plates in its width direction correspond to right and left ends of the power generating element 16 in the figure. When the electrolyte is poured in through the through hole 32 of the terminal rivet 31, it is poured to the vicinity of one of the ends. Accordingly, as compared with the case where the electrolyte is poured near the center of the electrode plates, the electrolyte will flow into the inside of the wound electrode plates at higher speeds. The liquid pouring can be performed in a short time.

Figure 10:
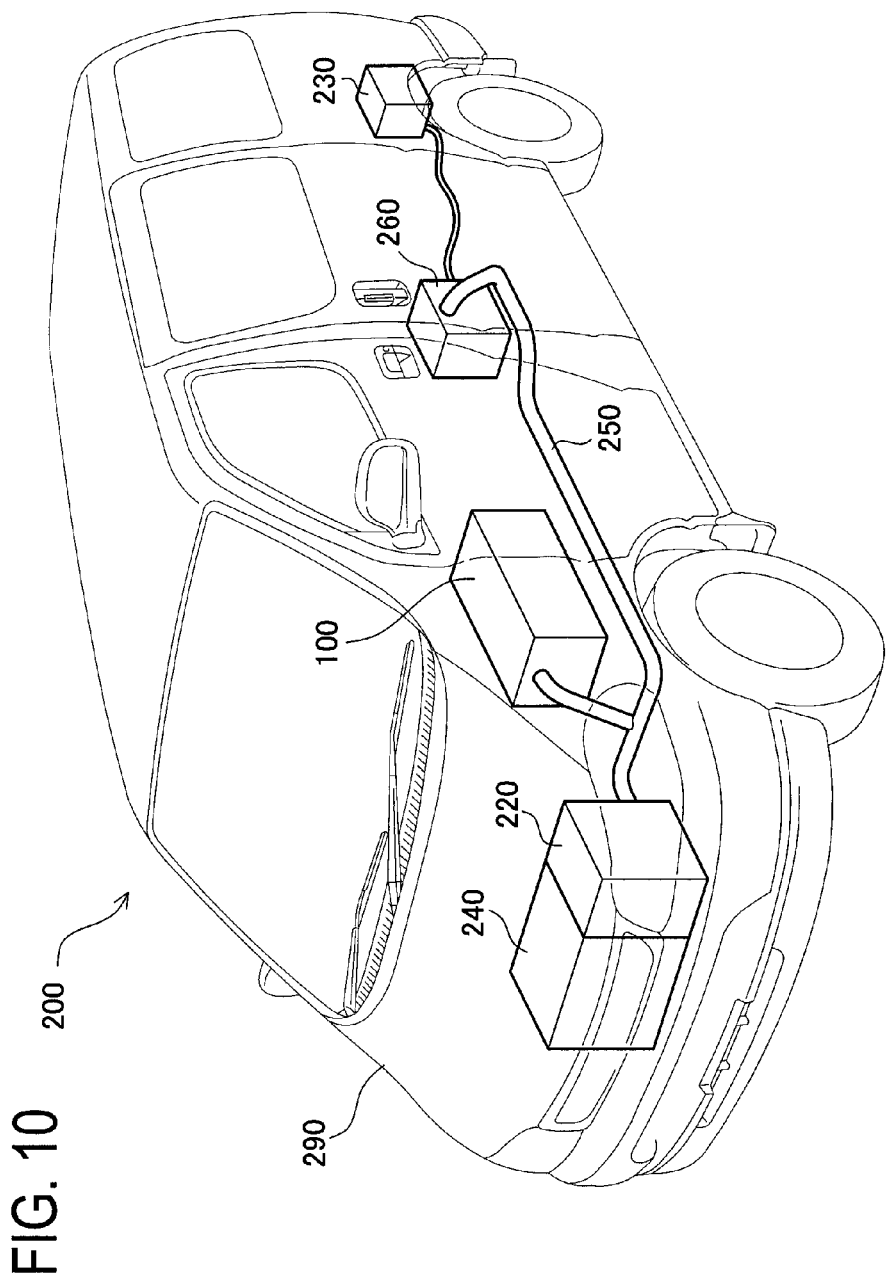
FIG. 10 is an explanatory view showing an example of a vehicle mounting the secondary battery in the present embodiment.

The secondary battery 10 in the above embodiment can be combined in plural into a battery assembly and mounted in a vehicle. An example of such vehicle is shown in FIG. 10. This vehicle 200 is a hybrid electric vehicle whose wheels are driven by a combination of an engine 240, a front motor 220, and a rear motor 230. This vehicle 200 includes a body 290, the engine 240, the front motor 220 attached thereto, the rear motor 230, a cable 250, an inverter 260, and a battery assembly 100 containing a plurality of the secondary batteries 10. Electric power is supplied from the battery assembly 100 to the front motor 220 and the rear motor 230 through the inverter 260.

The vehicle is any vehicle including a driving source entirely or partially using electric energy supplied from a battery. Examples of the vehicle are an electric vehicle, a hybrid electric vehicle, a plug-in hybrid electric vehicle, a hybrid electric railroad vehicle, a fork lift, an electric wheelchair, an electric power assisted bicycle, an electric motor scooter, etc.

Figure 11:
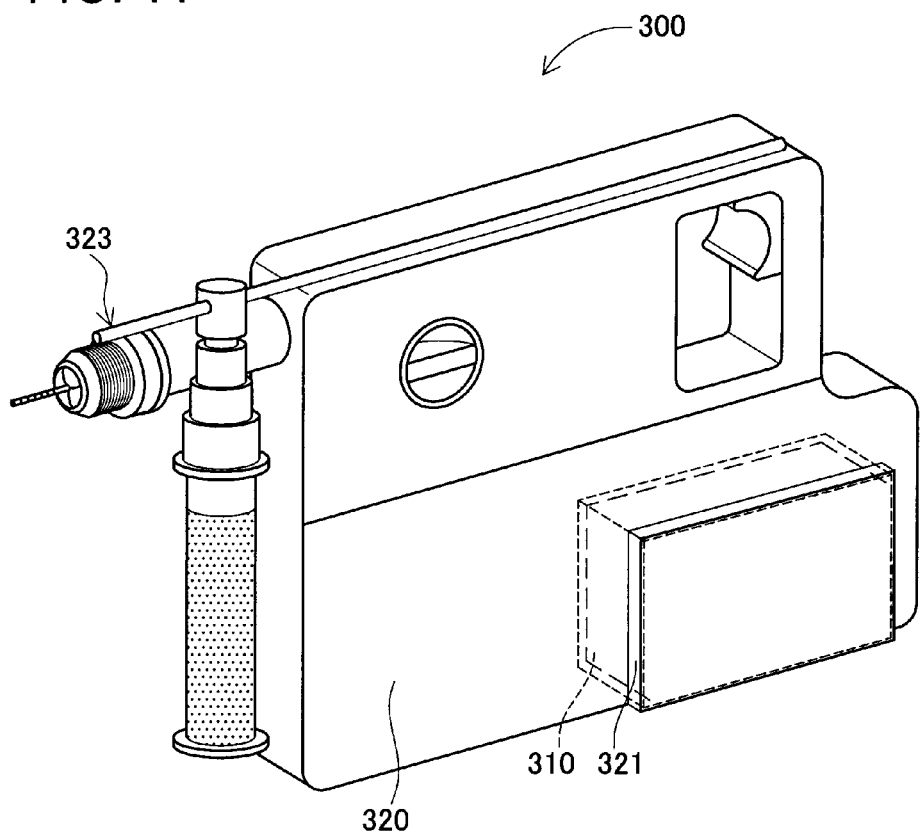
FIG. 11 is an explanatory view showing an example of a device mounting the secondary battery in the present embodiment.

The secondary battery 10 in the above embodiment can be mounted in various electric devices. A hammer drill which is an example of the electric devices is shown in FIG. 11. This hammer drill 300 mounts a battery pack 310 including the aforementioned secondary battery 10. The hammer drill 300 is a battery mounting device including the battery pack 310, a main body 320, and an operating part 323. Electric power is supplied from the battery pack 310 to the operating part 323. The battery pack 310 is removably housed on a bottom 321 of the main body 320 of the hammer drill 300.

The battery mounting device is any device that mounts a battery and utilizes it as at least one of energy sources. Examples of the device are home electric appliances, office equipment, and industrial equipment to be driven by batteries such as a personal computer, a cellular phone, a battery-operated electric tool, and an uninterruptible power supply system.

As the details are explained above, the secondary battery 10 in this embodiment, the current breaking mechanism 20 is provided to the positive electrode terminal 14, so that the current is interrupted by the rise in the internal pressure P. Especially, since the terminal rivet 31 is formed with the through hole 32 and the sealing cap 25 is provided to sealingly close the through hole, the sealing cap 25 can be directly subjected to the pressure difference between the internal pressure and the external pressure. No deformable member is provided inside the battery and thus no dead space is required. The external terminal 21 formed with the breakable portions 45 is fixed to the closing plate 12 by bending of the terminal rivet 31. Consequently, the battery having high shock resistance and vibration resistance can be achieved. Moreover, the through hole 32 can be used as a liquid inlet, thus allowing smooth liquid flow and eliminating the use of a special liquid inlet.

The above embodiments are mere examples and do not limit the present invention thereto. The present invention may be embodied in other specific forms without departing from the essential characteristics thereof.

For instance, the thicknesses of the thick portion, the thin portion, the breakable portion, and others are examples only and may be appropriately determined according to the size of a battery and the required performance and others. The shapes of the sealing cap 25, the protrusion, the slit, the breakable portion, and others may be selected from not only a square shape shown in the figures but also circular, elliptic, and other polygonal shapes.

In the above embodiments, the current breaking mechanism is provided to the positive electrode terminal but may be provided to the negative electrode terminal or to both terminals. However, from the viewpoint of the easiness of manufacture, aluminum is superior to copper. The sealing cap may be made of not only metal but also other materials if only it can be attached so as to provide both the reliable sealing property and the appropriate deformability. A safety valve may also be provided in a portion of this current breaking mechanism (e.g., a sealing cap). In the present embodiment, the sealing cap 25 is out of contact with the terminal rivet 31 and the thick portion 48 even during normal use. Alternatively, the cap 25 has only to be out of contact with them at least after the breakable portions are broken. In other words, the cap 25 may be configured to contact with the terminal rivet 31 or the thick portion 48 during normal use and not to contact with them after the breakable portions are broken.

Figure 12:
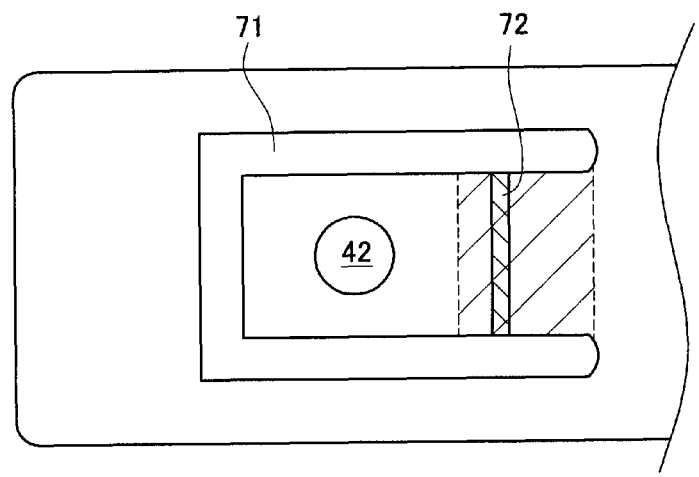
FIG. 12 is an explanatory view showing another example of an external terminal.
Figure 13:
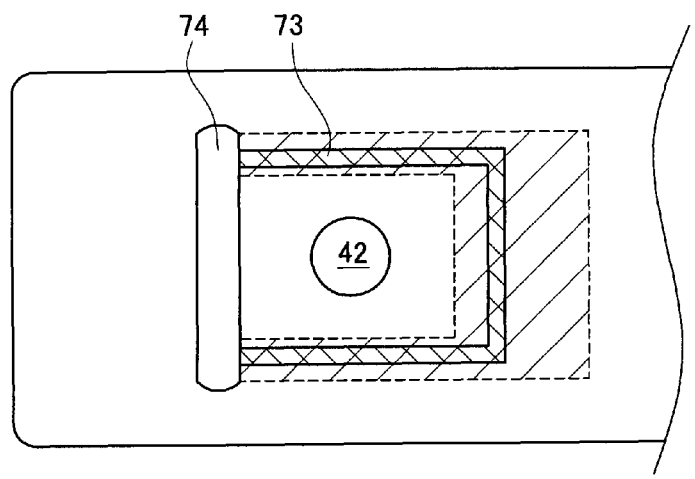
FIG. 13 is an explanatory view showing another example of an external terminal.

As modified examples of the external terminal, the following configurations are conceivable. For instance, the breakable portion may be provided in the form of a perforated line (i.e., an intermittent cut line) instead of a groove or in the form of a combination of the groove and the perforated line. The locations of the slits and the breakable portions are not limited to the above description. For example, as shown in FIG. 12, it may be arranged such that a slit 71 surrounds a through hole 42 on three sides and a breakable portion 72 is placed on the remaining one side. To the contrary, as shown in FIG. 13, there may be provided a breakable portion 73 on three sides and a slit 74 on one side.

Figure 15:
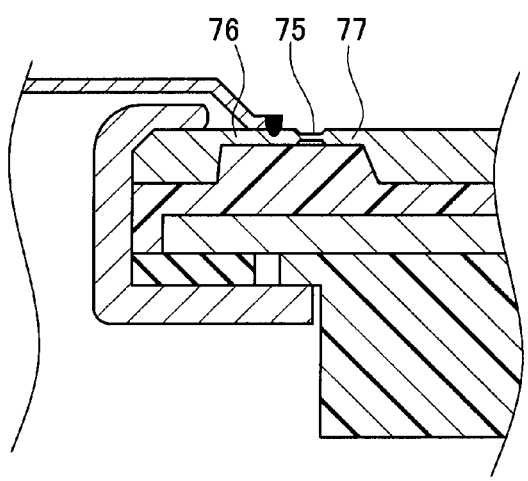
FIG. 15 is an end view showing another example of a current breaking mechanism.

As shown in FIG. 14, it may be arranged such that a through hole 42 is entirely surrounded by a breakable portion 75, an inner circumferential thin portion 67, and an outer circumferential thin portion 77 without providing any slit. In this case, no outer circumferential joining portion is provided and an inner joining portion is joined so as to be surely sealed over its entire circumference. Alternatively, as shown in FIG. 15 for example, a sealing cap may be joined only to the inner circumferential thin portion 76 over its entire circumference. In such a configuration, the through hole 42 is also hermetically covered over by the sealing cap even when the breakable portion 75 is broken by the internal pressure P.

Figure 16:
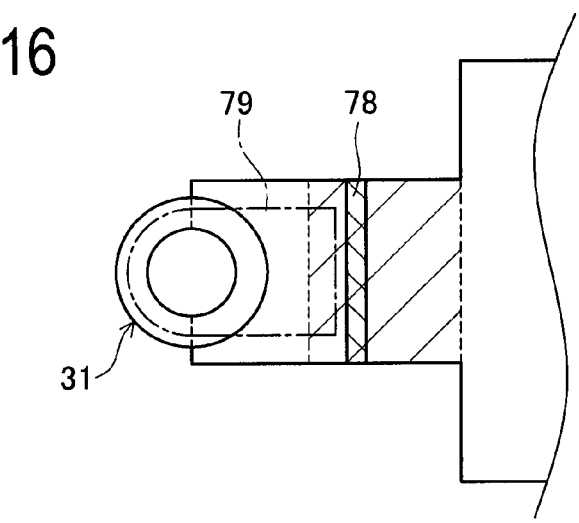
FIG. 16 is an explanatory view showing another example of an external terminal.

Moreover, as shown in FIG. 16, an external terminal may be configured not to allow a terminal rivet 31 to pass therethrough as shown in FIG. 16. In this example, the external terminal has a semi-circular recess and a part of a bent portion of a rivet terminal covers the external terminal. The remaining part of the bent portion is placed overlapping another member having the same height as the external terminal. As another alternative, a breakable portion 78 is formed extending across the entire width of the external terminal and a sealing cap is placed to hermetically seal only an area nearer the rivet terminal side than the breakable portion 78. As indicated by an alternate long and short dashed line in this figure, a sealing cap 79 may be provided to be joined to cover over the external terminal and a bent portion of the rivet terminal.

Figure 17:
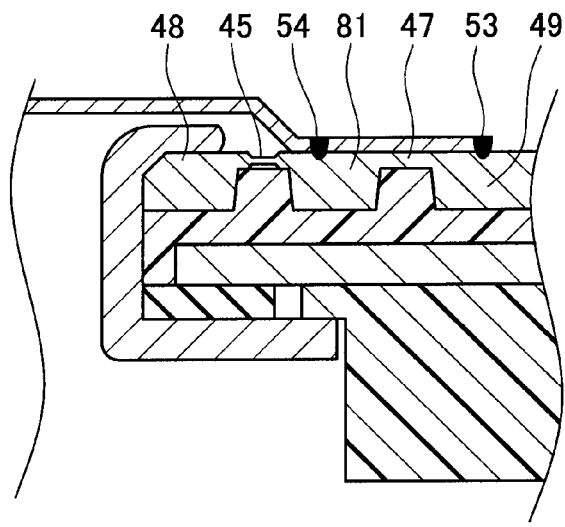
FIG. 17 is an end view showing another example of a current breaking mechanism.
Figure 18:
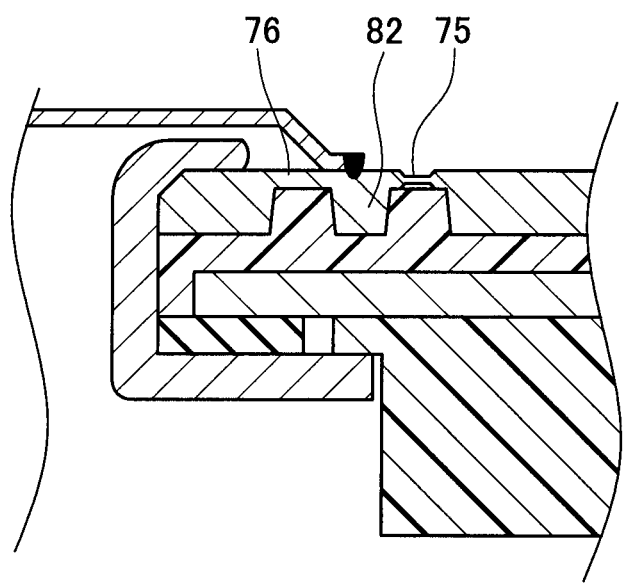
FIG. 18 is an end view showing another example of a current breaking mechanism.

The thin portion may not necessarily be located adjacent to the breakable portion. Alternatively, a portion in which the inner joining portion is provided may not necessarily be made thin. For instance, as shown in FIG. 17, a partial thick portion 81 may be provided between a breakable portion 45 and a thin portion 47 and with an inner joining portion 54. As the above example in which no outer circumferential joining portion is provided, it may be arranged such that a thick portion 82 is provided between a thin portion 76 and a breakable portion 75 and a sealing cap is joined thereto as shown in FIG. 18. In this case, furthermore, no thin portion needs to be provided on the outer circumferential side as shown in the figure. The thin portion is not indispensable.

REFERENCE SIGNS LIST

10 Secondary battery
11 Battery case
14 Positive electrode terminal
16 Power generating element
21 External terminal
22 Insulating gasket
25 Sealing cap
31 Terminal rivet
32 Through hole
43 Slit
45 breakable portion
47 Thin portion
48, 49 Thick portion
53 Outer circumferential joining portion
54 Inner joining portion
63 Thin-portion supporting portion
66 Protrusion
200 Vehicle
300 Hammer drill

The invention claimed is:

1. A battery comprising a battery case, a power generating element having a positive electrode and a negative electrode hermetically contained in the battery case, and positive and negative electrode terminals provided on the outside of the battery case, wherein the battery case includes a safety valve which breaks to release internal gas from the battery case when internal pressure of the battery case rises, and at least one of joining portions of the power generating element with the positive electrode terminal and the negative electrode terminal includes:

an external terminal placed on the outside of the battery case, the external terminal including a first portion, a second portion, and a breakable portion weaker than both the first and second portions, the first and second portions being continuous to each other through only the breakable portion, wherein the breakable portion is disposed outside of the battery case;

a current collecting member placed passing through the battery case so that at least a part of the current collecting member located outside the battery case is placed on the first portion of the external terminal in close contact relation, and the current collecting member being formed with a through hole for providing communication between the inside and the outside of the battery case; and a sealing cap covering an outer exit of the through hole on the outside of the battery case and being joined to the external terminal over the entire circumference of the through hole or joined to the external terminal and the current collecting member across them, wherein the sealing cap is deformable such that the sealing cap deforms when internal pressure of the battery case rises, the second portion of the external terminal is connected to the electrode terminal, the current collecting member is connected to the power generating element inside the battery case, and the sealing cap is configured to at least partially move away from the battery case without being broken before the safety valve breaks when internal pressure of the battery case rises, causing a part of the external terminal to be deformed to break the breakable portion and cut off a current path of the battery without releasing internal gas from the battery case.

2. The battery according to claim 1, wherein
the external terminal is formed, in at least one of the first portion and the second portion, with a thin portion thinner than other portions, and
the thin portion is deformed when the internal pressure of the battery case rises.

3. The battery according to claim 2, wherein
the external terminal is configured such that the second portion is formed around the first portion, and at least the second portion is formed with the thin portion, and
the sealing cap is joined to the second portion of the external terminal at an entire circumferential joining portion extending around the entire circumference of the through hole, the sealing cap being out of contact with both the first portion of the external terminal and the current collecting member at least after the breakable portion is broken.

4. The battery according to claim 3, wherein
the external terminal is formed with a slit between the second portion and the first portion and within a range of a region defined by the entire circumferential joining portion,
the first portion is surrounded by the breakable portion and the slit,
the thin portion is in the range of the region defined by the entire circumferential joining portion, and
the sealing cap is joined to the second portion of the external terminal also at the thin portion or a portion between the thin portion and the breakable portion.

5. The battery according to claim 4, wherein
the external terminal is configured such that the slit is formed in two places in parallel with each other, and
the breakable portion is formed in two places between the two slits and in a direction perpendicular to the slits.

6. The battery according to claim 4 further comprising an insulating member placed between the external terminal and the battery case,
a surface of the insulating member facing the external terminal being formed with at least one of a protrusion fitted in the slit and a protrusion fitted with the thin portion.

7. A vehicle comprising:
a motor for driving wheels to rotate upon receiving supply of electric power; and
a power source for supplying the electric power to the motor,
the power source including the battery according to claim 1.

8. A device comprising:
an operating part to be operated upon receiving supply of electric power; and
a power source for supplying the electric power to the operating part,
the power source including the battery according to claim 1.

9. The battery according to claim 5, further comprising an insulating member placed between the external terminal and the battery case,
a surface of the insulating member facing the external terminal being formed with at least one of a protrusion fitted in the slit and a protrusion fitted with the thin portion.

10. A vehicle comprising:
a motor for driving wheels to rotate upon receiving supply of electric power; and
a power source for supplying the electric power to the motor,
the power source including the battery according to claim 2.

11. A device comprising:
an operating part to be operated upon receiving supply of electric power; and
a power source for supplying the electric power to the operating part,
the power source including the battery according to claim 2.

* * * * *